Feb. 2, 1932.                R. RICHTER                1,843,519
                         PROJECTION OBJECTIVE
                         Filed March 27, 1931
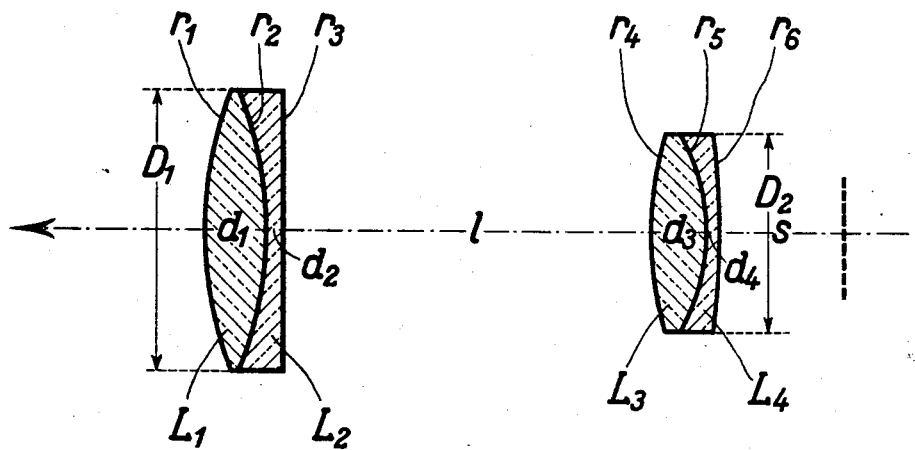
| | |
|---|---|
| $r_1 = +73.65$ | $d_1 = 12.0$ |
| $r_2 = -73.65$ | $d_2 = 3.5$ |
| $r_3 = \infty$ | $l = 73.32$ |
| $r_4 = +67.37$ | $d_3 = 11.0$ |
| $r_5 = -38.00$ | $d_4 = 2.5$ |
| $r_6 = -155.0$ | |
| | $L_1 = L_3$ | $L_2 = L_4$ |
|---|---|---|
| $n_D =$ | 1.5111 | 1.6199 |
| $\nu =$ | 60.5 | 36.3 |
Inventor:
Robert Richter Patented Feb. 2, 1932

1,843,519

UNITED STATES PATENT OFFICE

ROBERT RICHTER, OF JENA, GERMANY, ASSIGNOR TO THE FIRM CARL ZEISS, OF JENA, GERMANY

PROJECTION OBJECTIVE

Application filed March 27, 1931, Serial No. 525,851, and in Germany April 7, 1930.

There are known projection objectives consisting of two converging partial systems each of which is formed by a converging lens and a diverging lens cemented thereto, whereby the diverging lenses are so positioned as to face the object to be projected.

The present invention improves the known projection objectives of this kind in so far as it makes them offer the following advantages: great focal distance allowing an easy manipulation at the object window, good marginal and central definition at an aperture ratio of approximately 1:2.2 and over, the use of durable glasses distinguishing themselves by comparatively low cost and uniform optical quality. According to the invention these advantages are attained by using for the converging lens at the object side glass of low refraction, by choosing for the cemented surface of this converging lens on the object side a radius of an absolute value inferior to the 0.9 fold of the radius of the exterior surface of this lens, and by giving the diameter of the free aperture of the exterior surface of this converging lens a value not exceeding 36% of the focal width of the partial system on the object side, whereby there is to be understood by free aperture of the lens surface that part of this surface which is struck by any rays partaking in the projection of the image.

The following table states by way of example the values of an objective according to the invention, which has an aperture ratio of 1:1.9 and is represented by the accompanying drawing. The values given in the table refer to a focal length of the objective of 100 measuring units, whereby the focal distance $s$ amounts to 44.5 units. The partial system facing the screen consists of two lenses $L_1$ and $L_2$ and the one facing the object of two lenses $L_3$ and $L_4$. The diameter of the lenses pertaining to the first said partial system is $D_1=54.5$, that of the other system $D_2=39.0$. The free aperture of the exterior surface of the lens $L_3$ has a diameter of 37.2, and the focal length of the system on the object side amounts to 116.

| Radii | Thicknesses and distances |
|---|---|
| $r_1 = +\ 73.65$ | $d_1 = 12.0$ |
| $r_2 = -\ 73.65$ | $d_2 = 3.5$ |
| $r_3 = \infty$ | $l = 73.32$ |
| $r_4 = +\ 67.37$ | $d_3 = 11.0$ |
| $r_5 = -\ 38.00$ | $d_4 = 2.5$ |
| $r_6 = -155.0$ | |

Kinds of glass

| $L_1 = L_3$ | $L_2 = L_4$ |
|---|---|
| $n_D = 1.5111$ | 1.6199 |
| $v = 60.6$ | 36.3 |

I claim:

A projection objective of an aperture ratio of at least 1:2.2, consisting of two converging partial systems each of which is formed by a converging lens and a diverging lens cemented thereto, whereby the diverging lenses face the object to be projected, the converging lens on the object side being of glass having a refraction ratio inferior to 1.54, the radius of the cemented surface of this converging lens being according to its absolute value inferior to the 0.9 fold of the radius of the exterior surface of this lens, and the diameter of the free aperture of this exterior surface being not greater than 36% of the focal length of the partial system on the object side.

ROBERT RICHTER.